United States Patent
Moss

[19]

[11] Patent Number: 5,892,478
[45] Date of Patent: Apr. 6, 1999

[54] ADAPTIVE AZIMUTH PROCESSING FOR MONOPULSE IFF INTERROGATORS

[75] Inventor: Leonard A. Moss, Northport, N.Y.

[73] Assignee: GEC-Marconi Hazeltine Corporation Electronics Systems Division, Greenlawn, N.Y.

[21] Appl. No.: 958,016

[22] Filed: Oct. 27, 1997

[51] Int. Cl.$^6$ .................................................. G01S 13/44
[52] U.S. Cl. ........................ 342/149; 342/45; 342/140; 342/195
[58] Field of Search .............................. 342/45, 113, 147, 342/152, 140, 154, 149, 194, 195, 427

[56] References Cited

U.S. PATENT DOCUMENTS

| | | | |
|---|---|---|---|
| 4,128,839 | 12/1978 | McComas | 342/32 |
| 5,128,682 | 7/1992 | Kruger | 342/153 |
| 5,450,089 | 9/1995 | Hui et al. | 342/195 |

*Primary Examiner*—Ian J. Lobo
*Attorney, Agent, or Firm*—E. A. Onders; K. P. Robinson

[57] ABSTRACT

When an IFF system interrogates a target aircraft and receives IFF reply signals, monopulse processing of the reply signals can provide more accurate determination of target azimuth. However, when reply signals have amplitudes close to noise or jamming levels, azimuth processing by non-monopulse techniques such as beamsplitting or center of gravity analysis can provide better accuracy than monopulse azimuth processing. Methods are described to enable adaptive selection of the type of azimuth processing to be employed. Such selection is based on active comparison of received signal magnitudes against monopulse sum and difference signal threshold values and a noise threshold value. Monopulse azimuth processing can thus be used at all times, except when non-monopulse azimuth processing is chosen by such adaptive selection.

20 Claims, 3 Drawing Sheets

ADAPTIVE AZIMUTH PROCESSING FOR MONOPULSE IFF INTERROGATORS

SEQUENCE LISTING (Not Applicable)

RELATED APPLICATIONS (Not Applicable)

FEDERALLY SPONSORED RESEARCH (Not Applicable)

BACKGROUND OF THE INVENTION

This invention relates to Identification Friend or Foe (IFF) systems and, more particularly, to adaptive processing providing improved azimuth determination capabilities for IFF interrogator systems adapted for monopulse operation.

The design and implementation of IFF systems are well known. Typically, the frequency of radiated signals relative to the physical and electrical width of IFF system antennas results in a relatively wide radiation pattern. The narrow, horizontally rotated beam of a search radar system provides accurate determination of the azimuth bearing of a target, such as an aircraft. In contrast, the wider beam of a rotated IFF antenna typically does not directly provide adequate target azimuth resolution. As a result, additional processing of received IFF signals is required in order to enhance the capability of determining target azimuth based upon IFF returns from an IFF transponder mounted aboard a target aircraft. While different approaches have been utilized to provide such processing for azimuth determination, tradeoffs have generally been required. As a result, optimum performance has not been available for all operating conditions, which may involve varying levels of received signals in combination with varying levels of interference, such as jamming.

Objects of the present invention are, therefore, to provide new and improved methods of determining target azimuth in an IFF system. More particularly, an object is to provide azimuth determining methods for IFF applications which accomplish one or more of the following operating characteristics and capabilities:

improved azimuth determination;

multi-mode azimuth capability;

monopulse signal processing with adaptive azimuth processing;

automatic selection of azimuth mode responsive to received signal characteristics;

azimuth mode responsive to both relative jamming and noise levels;

simple and reliable adaptive azimuth mode selection; and avoidance of azimuth accuracy limitations during monopulse operation in the presence of jamming.

SUMMARY OF THE INVENTION

The invention relates to methods for use in an IFF system including a rotational antenna to interrogate and receive reply signals from a target having an IFF transponder. In accordance with the invention, a method of determining target azimuth includes the steps of:

(a) receiving reply signals from a target;

(b) deriving monopulse sum and difference signals from the reply signals;

(c) deriving a jamming threshold value based on a level of jamming signals present in the derived monopulse signals;

(d) performing threshold testing utilizing such jamming threshold value and a noise threshold value, with a positive test result indicative that a derived monopulse signal magnitude exceeds both of the jamming and noise threshold values;

(e) on a positive test result in step (d), utilizing a target azimuth value as determined by monopulse azimuth processing using sum and difference signal relative amplitude and phase; and (f) in the absence of a positive test result in step (d), utilizing a target azimuth value as determined by non-monopulse azimuth processing using signal amplitude relative to antenna pointing azimuth at signal reception.

In a preferred embodiment, in the method described above step (c) includes deriving a first jamming threshold value pertinent to the monopulse sum signal and a second jamming threshold value pertinent to the difference signal. In step (d), a positive test result is then indicative that both (a) a sum signal magnitude exceeds both the first jamming threshold value and the noise threshold value, and (b) that a difference signal magnitude exceeds both the second jamming threshold value and the noise threshold value. In step (f), non-monopulse azimuth processing may utilize known types of beamsplitting or center of gravity processing based on the monopulse sum signal amplitude relative to antenna pointing azimuth at signal reception.

For a better understanding of the invention, together with other and further objects, reference is made to the accompanying drawings and the scope of the invention will be pointed out in the accompanying claims.

DESCRIPTION OF THE INVENTION

Figure 1:
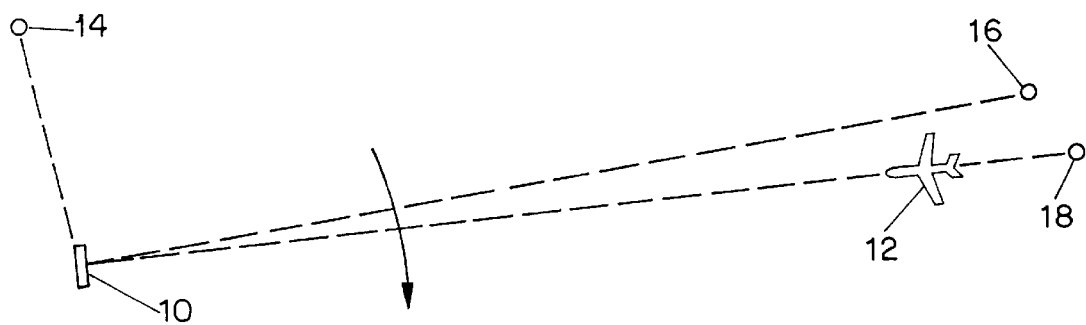
FIG. 1 is a conceptual plan view of the rotational beam of an IFF system sweeping past a target aircraft.

FIG. 1 is a simplified not-to-scale plan view showing a rotational antenna 10 of an IFF system which may be mounted at a fixed ground installation or mounted aboard a ship, aircraft or other vehicle. Antenna 10 rotates so that its radiation pattern scans in azimuth and is usable to interrogate and receive signals from a target, such as aircraft 12, having an IFF transponder. In typical operation of an IFF system, when the IFF transponder on aircraft 12 receives a radiated IFF interrogation signal, a reply is transmitted in rapid response to the received signal. Several interrogations and reply transmissions typically occur as the antenna sweeps past the target during each rotation of the interrogator antenna. Identification of friendly aircraft is accomplished by appropriate coding of transmitted signals.

Figure 2:
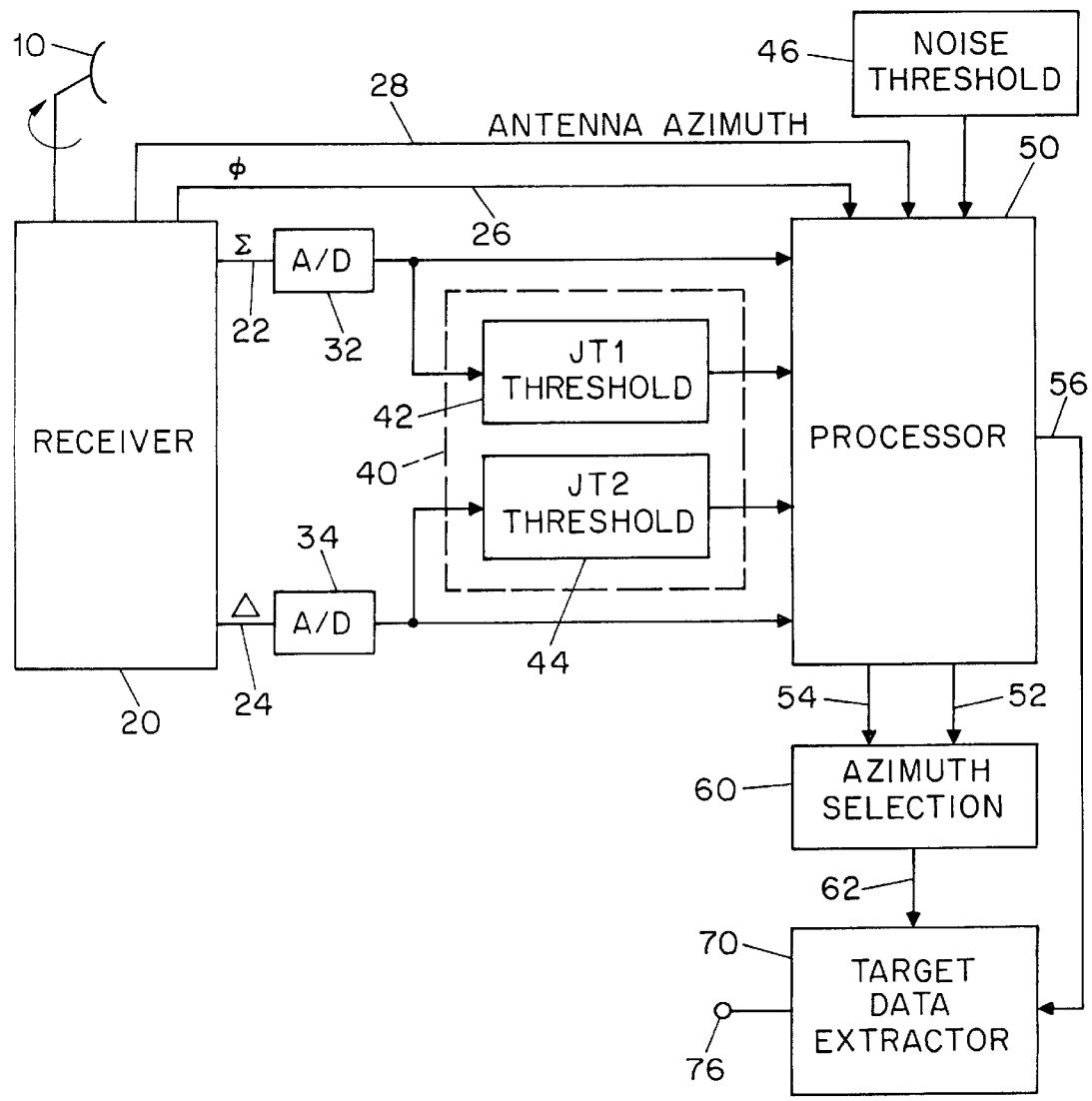
FIG. 2 is a block diagram of an IFF interrogator system utilizing the invention.

FIG. 2 illustrates, in simplified block diagram format, an IFF system arranged to implement a method of determining target azimuth in accordance with the invention. As shown, the IFF system includes antenna 10 coupled to receiver 20, which is effective to both receive reply signals and derive monopulse sum and difference signals at outputs 22 and 24, respectively. Receiver 20 is also arranged to identify the relative phase of signals received in the two lateral lobes of the difference pattern and provides a signal representative of such phase at output 26. A signal providing information as to the azimuth pointing direction of antenna 10 as it rotates appears at output 28. Respective analog-to-digital converters 32 and 34 convert the sum and difference signals to digital form for further processing. Derivation of the monopulse signals can be implemented in any appropriate manner by skilled persons.

As shown, the IFF system includes a threshold unit 40 responsive to the sum and difference signals in digital form to provide threshold value derivation based on representation of the relevant level of jamming signals. More specifically, unit 40 is illustrated as including first and second threshold circuits 42 and 44. As will be further described, first threshold circuit 42 is responsive to the sum signal to derive a first threshold level representative of the level of jamming signals, if any, currently affecting sum signal reception. Correspondingly, second threshold circuit 42 derives a second threshold level representative of the level of jamming signals, if any, currently relevant to the reception of the difference signal.

Figure 3:
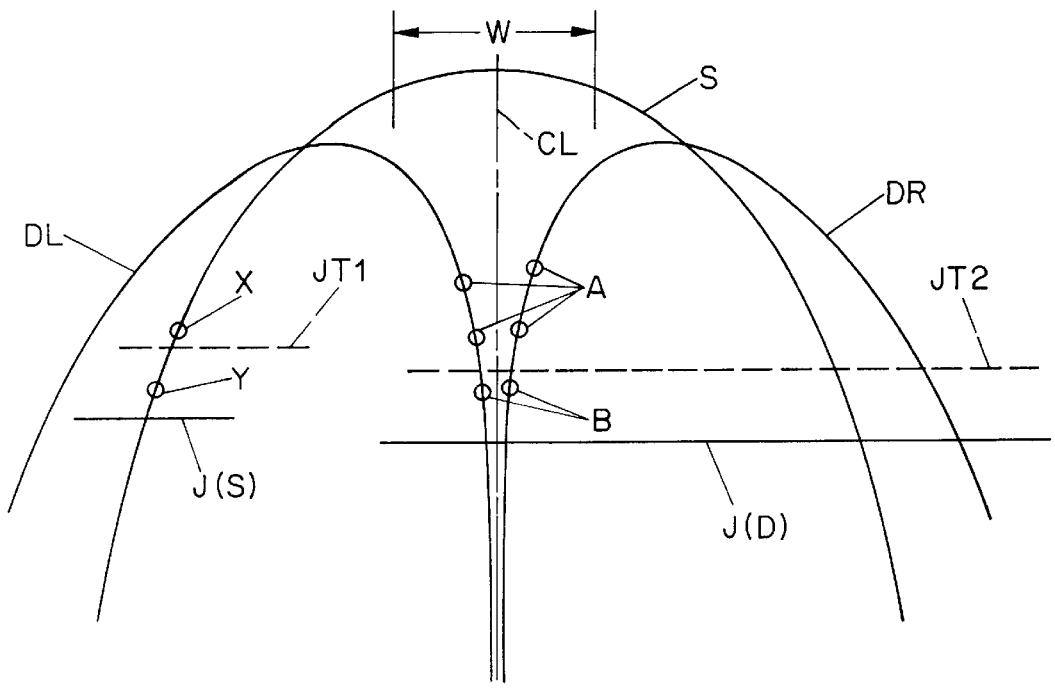
FIG. 3 and FIG. 4 are monopulse antenna patterns useful in describing the invention.

A "noise" level, as utilized in determinations of signal-to-noise (S/N) ratio, is typically a fixed value dependent upon receiver design, thermal noise and possibly other factors, which affects all received signals similarly. The term "jamming" is broadly defined to include intentional signals of a disruptive nature radiated at specific frequencies, on a wide spectrum or noise basis, on a frequency shifting basis, or in other manner, typically from one or more localized points or sources. Jamming, as defined, also includes interference or noise signals emanating from a source on an unintended or other basis, and generally includes undesired signals which tend to interfere with reception of desired signals. Thus, with reference to FIG. 1, since antenna 10 provides a directive radiation pattern a jamming signal radiated from location 14, for example, may have negligible effect on reception of IFF replies from target 12. Conversely, a jammer at location 16 or location 18, depending on the nature of the jamming signal, may have a significant disruptive effect on reception of the IFF replies from target 12. Further, depending on the beamwidth of antenna 10, when the beam of the antenna is pointing at target 12, jamming signals from points 16 and 18 may have significantly different effects on sum and difference signal reception. Thus, a jamming signal from point 16 may be received in a reduced gain portion of the main beam pattern for sum reception, but may be received at near maximum gain within the left lobe of the wider beam pattern operative for monopulse difference signal reception. The opposite is also true for a jamming signal received along antenna boresight from point 18 when the antenna is pointing at target 12. The sum and difference beam patterns effective for monopulse reception are illustrated in FIG. 3. As shown, sum pattern gain is high at boresight and decreases away from boresight, while difference pattern gain has a null on boresight and is higher at the peaks of the left and right lobe patterns. As a result, while a fixed value can be utilized for a receiver noise threshold value, jamming thresholds must be actively determined, so that the jamming threshold will be appropriate for reception in a specific monopulse mode at a specific azimuth in a specific time period.

In the FIG. 2 system, jamming threshold circuits 42 and 44 are arranged to actively respond to the signals actually being received. Using established techniques, which may involve short term and longer term signal processing and integration, or other azimuth dependent determination of jamming effects, circuits 42 and 44 are effective to derive values for current jamming levels affecting the reception of sum and difference signals respectively, at azimuth bearings of interest. A current effective jamming level is thus derived for each of sum signal reception and difference signal reception relative to the location of a target of interest. Jamming threshold values are then provided at a predetermined signal level in excess of the current jamming level as determined. Thus, the threshold value may be set at a margin of 8 to 12 dB above the derived jamming level. Consistent with the foregoing, it will be appreciated that for reception of target replies from a specific azimuth direction, the first (sum) jamming threshold may be set at a current value which is variable over a wide range of signal levels. Simultaneously, the second (difference) jamming threshold may have a current value at a distinctly different signal level or may have a current value comparable to the first jamming threshold, depending upon actual jamming conditions experienced. As represented in FIG. 2, the resulting first and second jamming thresholds adapted for threshold testing of the current monopulse sum and difference replies are coupled to processor 50 from threshold circuits 42 and 44, respectively.

Also represented in FIG. 2 is a noise threshold circuit 46 coupled to processor 50. While represented as a separate box 46 for purposes of illustration, the purpose of circuit 46 is to provide a predetermined threshold value based on receiver noise and may actually be implemented on a simple basis such as an appropriate bias threshold for signal processing purposes. Typically, a minimum threshold level (MTL) is determined based on thermal noise characteristics of the receiver. The MTL, representing the minimum usable signal level in operation of the receiver, is then increased by a suitable margin (12 dB, for example) to provide a noise threshold value. Once designated, a noise threshold value (e.g., equal to MTL+12 dB) is used as a fixed noise threshold not subject to change on a reply to reply basis for incoming monopulse signals. Thus, while the noise threshold may be adjusted whenever appropriate, it is typically not arranged to be actively adjusted to reflect characteristics of current signal reception.

As shown in FIG. 2, the IFF system includes the processor 50, which is arranged to perform video signal processing and other processing as may be implemented in known types of IFF systems. In accordance with the invention, processor 50 also evaluates or tests the incoming monopulse signals to determine whether received signal magnitudes exceed relevant thresholds. More particularly, in the illustrated example an incoming sum signal is compared to both the noise threshold and to the actively derived first jamming threshold. A "positive" test result is indicative that a monopulse sum signal for a specific target reply has a signal magnitude which equals or exceeds both the noise threshold and the actively derived first jamming threshold. A "negative" test result indicates that such sum signal has a magnitude which is less than at least one of the noise threshold and the first jamming threshold. In similar fashion for the difference signal, positive and negative test results are respectively based on whether the difference signal magnitude exceeds both, or is less than at least one of, the noise threshold and the second jamming threshold. It will be appreciated that in a particular embodiment, a signal magnitude which exactly equals a threshold value may be considered as either a positive or a negative result. Accordingly, a "positive" test result indicates a signal meets a threshold value, regardless of whether the signal comparison is based on exceeding a threshold value or meeting (or exceeding) the threshold value. In other processing approaches in different embodiments, the noise and sum jamming thresholds may effectively be combined and replaced by a single threshold representing the highest of the two thresholds, for example, so that the sum signal magnitude would be required to pass only one composite threshold test.

For descriptive purposes, inputs to processor 50 of FIG. 2 are illustrated as including the three threshold values coupled from the first, second and noise threshold circuits 42, 44 and 46, respectively, with the results of threshold testing provided at respective outputs 52 and 54. Thus, in the illustrated system format, a signal at output 52 indicates whether the result of sum signal threshold testing was positive or negative and a signal at output 54 indicates whether the result of difference signal threshold testing was positive or negative. The system is illustrated as also including an azimuth selection circuit 60 coupled to outputs 52 and 54 of processor 50. While represented as a separate box for purposes of description, the purpose of circuit 60 is basically to provide an "or" type function. In the event that threshold processing of either the sum signal or the difference signal results in a negative test result (as defined above) there will be provided at output 62 an indication of a negative test result. A negative indication appearing at output 62 thus represents a composite negative test result for the monopulse sum and difference signal levels representing a particular reply from a target, for example. As will be described, this composite negative test result at output 62 is used in target azimuth determinations pursuant to the invention. It should be noted that while development of a composite negative test result indication has been described, it will be apparent that threshold test results can be provided on a positive basis. For this case, an indication appearing at output 62 would represent the result that for a particular target reply the sum signal has met or exceeded the noise and first jamming thresholds and also that the associated difference signal has met or exceeded the noise and second jamming thresholds.

With reference to FIG. 2, the IFF system as shown also includes a target data extractor 70 arranged to carry out processing as may be performed in known types of IFF systems in order to provide information as to target identification, range, azimuth, etc., at output port 76. As illustrated, target data unit 70 receives processed video-type signals representing received target replies, via output 56 of processor 50. For purposes of the present description, signals received by data unit 70 via line 56 are considered as including, for a specific target, azimuth data determined by two alternative types of signal analysis as will be described, as well as target identification, range, and other appropriate data.

To provide a first alternative determination of azimuth, the azimuth of a target is determined by monopulse azimuth processing. Such processing may be implemented by skilled persons in any appropriate manner, typically based on the amplitude of a target reply as received in the monopulse sum channel relative to the amplitude and phase of the same target reply as received via the monopulse difference channel. Look-up tables based on such amplitudes and phase or other known computational approaches may be employed. The result of such analysis is to provide a target azimuth value as determined by monopulse azimuth processing.

To provide a second alternative determination of azimuth, the azimuth of the same target is determined on what will be termed a non-monopulse basis, utilizing the amplitude of target returns as received in different portions of the sum signal antenna pattern (or a composite antenna pattern) relative to antenna pointing azimuths at reception of such signals. A variety of non-monopulse techniques may be employed by skilled persons. By way of example, two such techniques may be summarized as follows. In beamsplitting type processing, received reply signals from a target are selected as representing signals received at the leading and trailing edges of the rotating antenna beam (e.g., the first reply and the last reply received from a target as the rotating beam sweeps past the target). By averaging the antenna pointing angles at reception of such leading and trailing (first and last) replies, an indication of the actual target azimuth is provided. Center of gravity type non-monopulse processing uses an approach whereby for each reply received as the beam sweeps across the target on a particular antenna rotation, the received signal magnitude is multiplied by the antenna pointing azimuth at reception of such reply. After summing all such products (e.g., for each reply from the target during an antenna rotation) the resulting summation is divided by the sum of all of the magnitudes of the same received signals. The result of such division provides an indication of the actual target azimuth. Any suitable non-monopulse technique may be employed.

As will be further discussed with reference to FIGS. 3 and 4, it has been determined that whereas non-monopulse azimuth techniques can provide generally acceptable results in IFF system applications, monopulse processing permits determination of target azimuth with improved accuracy under most operating conditions. Conditions under which monopulse processing provides reduced accuracy generally occur when received IFF sum or difference signals exhibit relatively low magnitude relative to noise or any jamming signals present. Under such conditions, non-monopulse processing can typically provide more accurate determinations of target azimuth (subject, of course, to reply signals being adequately discernable in the presence of noise and jamming). Thus, pursuant to the invention, it will now be appreciated that the composite threshold test result provided at output 62 of unit 60 is directly applicable to selection between the monopulse or non-monopulse determinations of target azimuth. On an indication of negative results (i.e., absence of a positive result) of threshold testing, the non-monopulse target azimuth determination is utilized. On an indication of positive results of threshold testing, the monopulse target azimuth determination is utilized for the greater accuracy it affords.

In the illustrated IFF system configuration, unit 70 is thus responsive to a negative threshold test result, received via line 62, to provide target data at output port 76 which includes an indication of target azimuth as derived by non-monopulse processing (e.g., by beam splitting or center of gravity techniques). At all other times (in the presence of a positive threshold test result) unit 70 provides target data including target azimuth information determined by monopulse processing.

By use of the invention, the IFF system of FIG. 2 thus achieves improved operation by use of more accurate target azimuth data provided by monopulse processing, except when the accuracy of the results of such processing may be affected by low signal-to-noise or signal-to-jamming values as determined by threshold testing. In the following section, methods pursuant to the invention will be described with greater particularity. With respect to FIG. 2, it should be noted that the particular form of presentation and breakout of specific block units were provided primarily for purposes of description. As will be apparent to skilled persons, in particular embodiments of the invention processor 50 and target data extractor 70 may be separate units or may be provided by a single microprocessor or other suitable unit, and many or all of the other elements shown as separate boxes in FIG. 2 may be combined with or included in unit 50, unit 70 or a combined processor unit. Other elements, units and capabilities may also be included as appropriate to provide an IFF system with desired overall capabilities.

OPERATION

With reference to FIG. 3, there are represented monopulse sum and difference antenna patterns effective for reception of reply signals from an IFF transponder mounted aboard a target aircraft, for example. As shown, the sum pattern S has a single lobe form, while the difference pattern includes left lobe DL and right lobe DR. As is typical for monopulse operation, the sum pattern provides highest gain for signal reception along boresight at the beam centerline CL, while the difference pattern has a null at the centerline and gain is highest at the peak levels of the left and right lobes, as shown. In FIG. 3 the left and right difference lobes are shown as providing equal gain and it will be understood that, in monopulse processing, signals appearing the left lobe are represented by signals differing in phase by 180 degrees from signals received in the right lobe.

As the rotational antenna of the IFF system turns in azimuth, the FIG. 3 antenna pattern is effectively rapidly swept across the location of a target aircraft. At the same time, a series of interrogation signals are transmitted and reply signals are received from the target, which effectively remains in substantially fixed position while being swept by the antenna pattern because of the short time interval involved. The six small circles in groups A and B in FIG. 3 represent reception of six reply signals while the antenna pattern sweeps the target location during one rotation of the IFF system antenna. Considering only the difference pattern, the angular incidence of the replies, relative to the gain contours of the respective left and right difference lobes, can be depicted as determining the magnitude of the received monopulse difference signals. Thus, as derived during monopulse processing of the received reply signals, the magnitudes of the four difference signals depicted in group A are greater than those of the two difference signals depicted in group B, which were received close to the null between the left and right lobes of the difference pattern.

Initially, the second jamming threshold as applicable to the received difference signals will be considered. In FIG. 3, the second jamming threshold value is represented as JT2. As already discussed, the value or gain level of JT2 is derived on an active basis by first deriving a representation of the jamming level J(D) of jamming signals currently pertinent to difference pattern signal reception in the vicinity of the azimuth of the target. In this respect, it can be observed with reference to FIG. 3 that jamming signals originating at a point separated in azimuth by about one-half of the antenna beamwidth (e.g., originating from point 16) would be received at close to maximum gain in the difference pattern when the antenna 10 is receiving replies from target 12. In contrast, a jammer at the same azimuth as the target (e.g., at point 18) would be subjected to the difference beam null and be of reduced effect. (Conversely, for sum pattern S, a jammer located at an azimuth closely corresponding to the target azimuth is received at close to maximum sum pattern gain, resulting in maximum deleterious effect on sum channel signal reception.)

For the second jamming threshold value JT2, the following results are represented in FIG. 3. When threshold testing is performed to compare the monopulse difference signals represented in group B to the second jamming threshold JT2, a negative test result is indicative that signal magnitude is less than the threshold, as illustrated. For jamming threshold testing of the reply signals represented in group A a positive test result is indicative that the signal magnitude meets the threshold JT2 (e.g., equals or exceeds the threshold).

As discussed, a combination of four threshold tests may be utilized in application of the invention. Thus, in addition to a jamming threshold test, monopulse difference signals are typically also tested against a noise threshold. A noise threshold test may be addressed by simply temporarily considering line J(D) in FIG. 3 to represent a predetermined receiver noise value and line JT2 to temporarily represent a noise threshold 12 dB above the noise value. Then, assuming FIG. 1 has effectively been adjusted to a different gain scale vertically to correspond to the actual receiver noise level, the A group of replies would provide a positive test result and the B group a negative test result against the noise threshold. Of course in practice, for a given set of replies some might have a positive test result for noise and all replies might test negatively against the applicable jamming threshold, for example, or the results for jamming and noise threshold testing might otherwise differ.

Pursuant to the invention, in the example illustrated in FIG. 3 with reference to the replies in group A and B and for this rotation of the antenna past the target, a group of four replies have provided a positive test result for the jamming threshold. Assuming some or all of these four A group replies also provide a positive test result for the noise threshold, and assuming some or all of these four A group replies also provide positive test results for testing of the sum signal magnitude against both jamming and noise thresholds, then the target azimuth based on replies received from the target during this antenna rotation would be determined by monopulse azimuth processing. That is, a determination of the target azimuth value would be made on the basis of amplitude and phase processing of the derived monopulse sum and difference signals.

Threshold testing of the sum signals can be addressed briefly by reference to the left side of FIG. 3. As illustrated, the first jamming threshold JT1 is independently derived for the sum signal at a margin of 12 dB above a jamming level J(S) determined to represent the current level of jamming signals affecting the sum pattern S during reception of replies from target 12. As shown, a sum channel reply signal of magnitude X provides a positive test relative to the first jamming threshold JT1, while a reply of magnitude Y provides a negative test result. Since the receiver noise figure is common, the sum signal magnitude provides a positive test result when it meets both the first jamming threshold JT1 and also the same noise threshold utilized for the difference signal.

Figure 4:
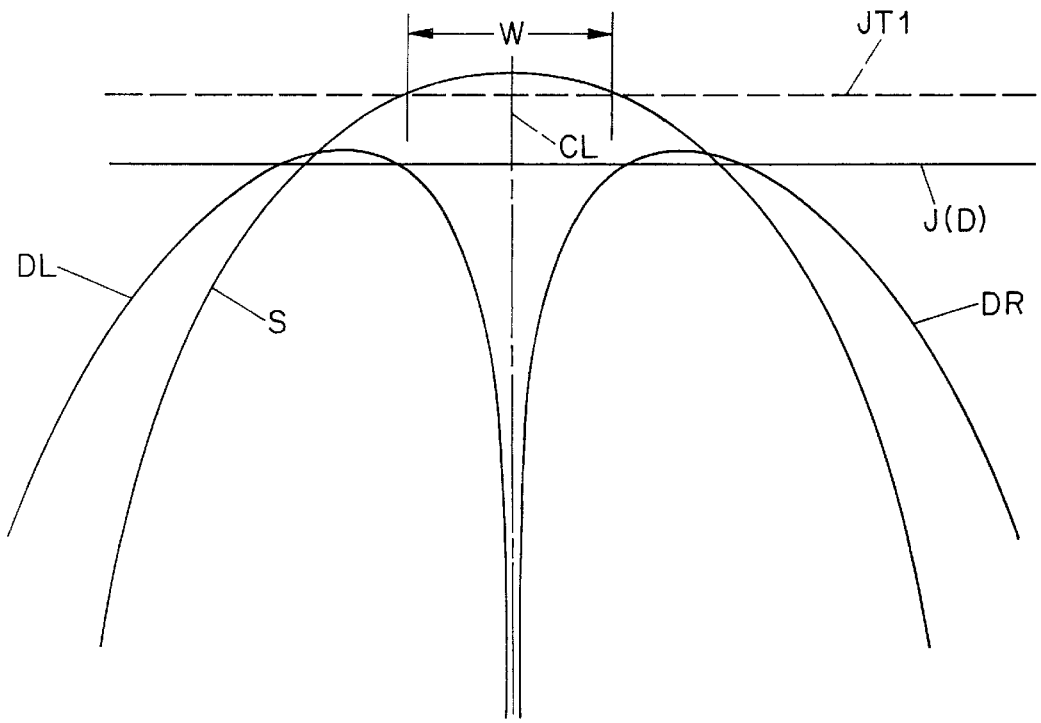

Referring now to FIG. 4, there is illustrated a case in which the first jamming threshold JT1 is close to the peak magnitude of the sum signal. At the same time it is assumed that the second jamming threshold JT2 (not shown) has such a high value as to exceed the magnitude of any reply received in the difference channel. As a result, in the presence of the resulting negative test result (at least one of the sum and difference signals failing at least one threshold test) target azimuth is determined by non-monopulse processing. For example, either center of gravity or beam splitting type processing can be utilized as described above. Such processing would be based on replies received in the sum channel and having magnitudes exceeding the J(S) jamming level illustrated in FIG. 4, for example. With reference to FIGS. 3 and 4, signal processing and azimuth determinations may be enhanced by techniques effectively providing beamwidth reduction. Thus, a reduced effective beamwidth, such as indicated at W, may be achieved by known processing techniques, such as receiver sidelobe suppression processing, so that for signal processing purposes attention may be concentrated on replies received within the narrowed beamwidth W.

Figure 5:
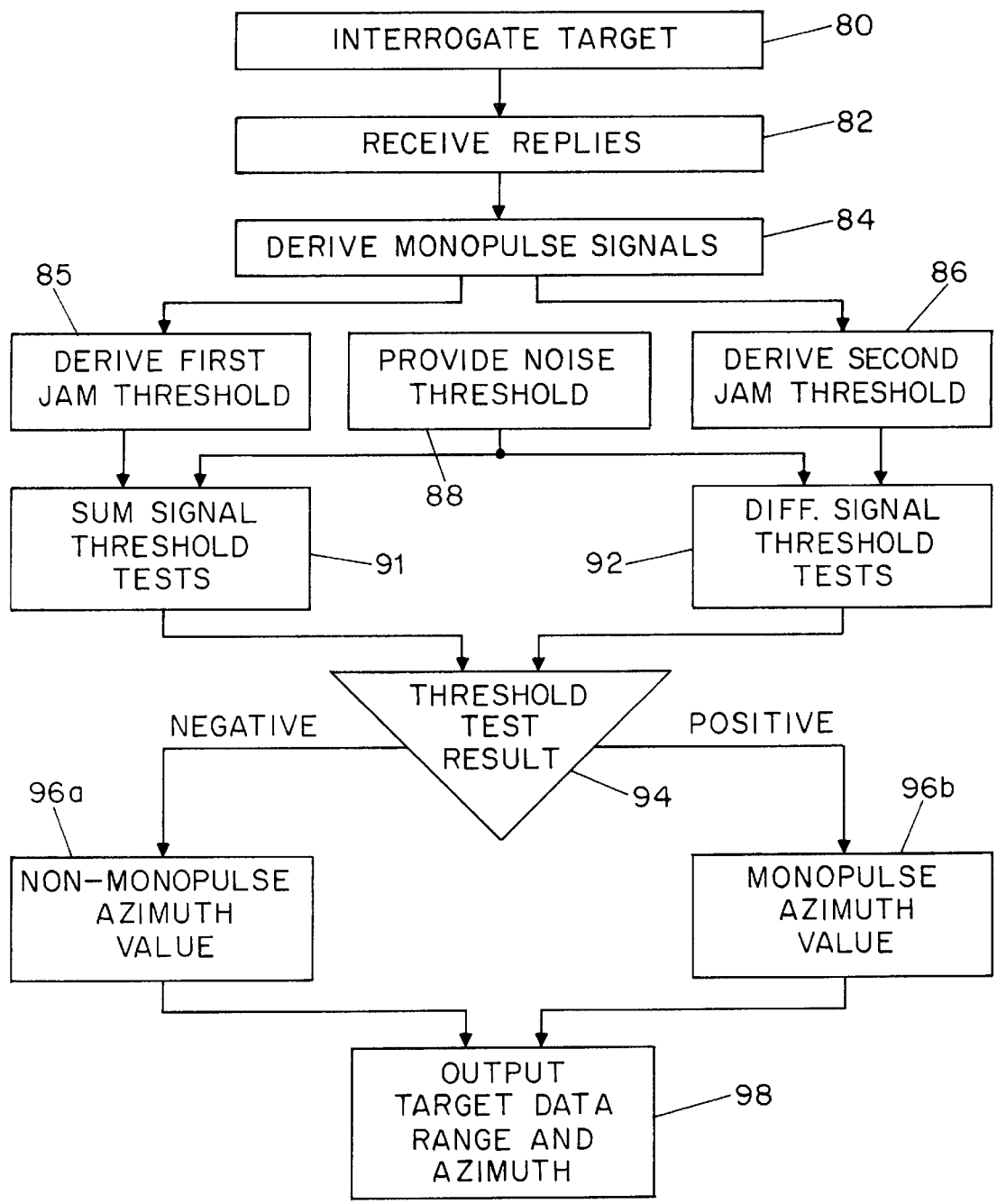
FIG. 5 is a flow chart used to describe a method of adaptively determining target azimuth in accordance with the invention.

In view of the foregoing, a method of determining target azimuth in accordance with the invention may be summarized as follows with reference to the embodiment illustrated in the flow chart of FIG. 5. At step 80, IFF interrogation signals are transmitted via the rotating antenna of the IFF system. At step 82, reply signals from an IFF transponder mounted aboard a target aircraft are received via the antenna. Utilizing monopulse type signal processing, monopulse sum and difference signals are derived at step 84. Phase information relative to signals received via the left and right lobes of the difference pattern is also provided.

At step 85, a first jamming threshold value is derived. As discussed above, there is actively derived a representation of the current level J(S) of jamming type signals which affect sum signal reception at the target azimuth. Thus, as noted, a jamming signal at the same azimuth bearing as a target aircraft would be received in the highest gain portion of the sum signal antenna pattern, while the same jamming signal shifted in azimuth by 90 degrees might be of negligible effect. To provide the first jamming threshold JT1, the derived jamming level J(S) is increased by a gain margin (e.g., 12 dB) to provide a reliable signal threshold above the jamming level. The first jamming threshold JT1 is thus 12 dB above the actively derived jamming level relevant to sum signal reception for a given target. At step 86, a second jamming threshold JT2 is similarly derived. For reception of IFF transponder signals from a target azimuth, the difference signal antenna pattern gain will typically be relatively low at the target azimuth bearing and higher in the vicinity of half beamwidth points left and right of that bearing. A current representation of the jamming level J(D) experienced at those points is increased by a gain margin (e.g., 12 dB) to provide the second jamming threshold JT2 relevant to difference signal reception. At step 88, a noise threshold, representing a predetermined receiver noise figure increased by 12 dB, is provided. While a 12 dB margin may be suitable in determining the jamming and noise thresholds, other margins and different margins for the different thresholds may be appropriate in particular embodiments.

At step 91, the magnitude of sum signals derived for replies from a particular target is compared to both the first jamming threshold and the noise threshold. Similarly, at step 92, the magnitude of difference signals derived for replies from that target is compared to both the second jamming threshold and the noise threshold. The results of such threshold testing are combined or accumulated at step 94. A negative test result is indicative of the condition that at least one of the sum and difference signals has a magnitude less than at least one of the relevant jamming threshold and the noise threshold. A positive test result is indicative that each of the sum and difference signals has a magnitude exceeding the relevant jamming and noise thresholds.

At step 96a, in response to a negative test result indicated at step 94, the IFF system utilizes a target azimuth value as determined by a non-monopulse type signal processing (e.g., by beamsplitting or center of gravity type processing). Alternatively, if the test result indicated at step 94 is positive, monopulse azimuth processing, using sum and difference signal relative amplitude and phase, is utilized at step 96b to provide a determination of target azimuth. At step 98, target data is provided by combining the target azimuth data from either step 96a or 96b, as appropriate, with other target data, such as target identification, range, etc. The output of such composite target data can then be coupled to a display or otherwise utilized as suitable in operation of the IFF system. While FIG. 5 is provided for purposes of illustration and description of a method utilizing the invention, in particular embodiments changes and modifications may be implemented by skilled persons having an understanding of the invention.

While there have been described the currently preferred embodiments of the invention, those skilled in the art will recognize that other and further modifications may be made without departing from the invention and it is intended to claim all modifications and variations as fall within the scope of the invention.

What is claimed is:

1. For use in an IFF system including a rotational antenna to interrogate and receive reply signals from a target having an IFF transponder, a method of determining target azimuth comprising the steps of:

(a) receiving reply signals from said target;

(b) deriving monopulse sum and difference signals from the reply signals;

(c) deriving a jamming threshold value based on a level of jamming signals present in said derived monopulse signals;

(d) performing threshold testing utilizing said jamming threshold value and a noise threshold value, with a positive test result indicative that a derived monopulse signal magnitude exceeds both of said jamming and noise threshold values;

(e) on a positive test result in step (d), utilizing a target azimuth value as determined by monopulse azimuth processing using sum and difference signal relative amplitude and phase; and (f) in the absence of a positive test result in step (d), utilizing a target azimuth value as determined by non-monopulse azimuth processing using signal amplitude relative to antenna pointing azimuth at signal reception.

2. A method as in claim 1, wherein step (c) includes deriving a first jamming threshold value pertinent to said sum signal and a second jamming threshold value pertinent to said difference signal, and in step (d) a positive test result is indicative that a sum signal magnitude exceeds both said first jamming threshold value and said noise threshold value and that a difference signal magnitude exceeds both said second jamming threshold value and said noise threshold value.

3. A method as in claim 1, wherein in steps (e) and (f) said target azimuth value is the azimuth of the target relative to antenna boresight at a reference alignment of said antenna.

4. A method as in claim 1, wherein in step (f) said non-monopulse azimuth processing uses the monopulse sum signal amplitude relative to antenna pointing azimuth at signal reception.

5. A method as in claim 1, wherein in step (f) said non-monopulse azimuth processing is beamsplitting type processing based on the average of the antenna pointing azimuth angles at reception of the first reply and last reply from said target during an antenna rotation.

6. A method as in claim 1, wherein in step (f) said non-monopulse azimuth processing is beamsplitting type processing based on the average of the antenna pointing azimuth angles at reception of a reply from said target at the leading edge of antenna beam coverage and at reception of a reply from the target at the trailing edge of antenna beam coverage during an antenna rotation.

7. A method as in claim 2, wherein in step (f) said non-monopulse azimuth processing is beamsplitting type processing based on the average of the antenna pointing azimuth angles at reception of a reply from said target at the leading edge of antenna beam coverage and at reception of a reply from the target at the trailing edge of antenna beam coverage during an antenna rotation.

8. A method as in claim 1, wherein in step (f) said non-monopulse azimuth processing is center of gravity type processing based on summation of the product of a received signal magnitude times antenna pointing azimuth at signal reception, for each reply from a target during an antenna rotation, divided by the summation of all said signal magnitudes.

9. A method as in claim 2, wherein in step (f) said non-monopulse azimuth processing is center of gravity type processing based on summation of the product of a received signal magnitude times antenna pointing azimuth at signal reception, for each reply from a target during an antenna rotation, divided by the summation of all said signal magnitudes.

10. For use in an IFF system including a rotational antenna to interrogate and receive reply signals from a target having an IFF transponder, a method of determining target azimuth comprising the steps of:

(a) receiving reply signals from said target;

(b) deriving monopulse sum and difference signals from the reply signals;

(c) performing threshold testing, with a positive result indicative that a derived monopulse signal magnitude exceeds a threshold value;

(d) on a positive test result in step (c), utilizing a target azimuth value as determined by monopulse azimuth processing; and (e) on a negative test result in step (c), utilizing a target azimuth value as determined by non-monopulse azimuth processing using signal amplitude relative to antenna pointing azimuth at signal reception.

11. A method as in claim 10, wherein in step (c) threshold testing employs a noise threshold value with a positive test result indicative that a derived monopulse signal magnitude exceeds said threshold value.

12. A method as in claim 10, wherein in step (c) said threshold testing employs a jamming threshold value based on a level of jamming signals, with a positive test result indicative that a derived monopulse signal magnitude exceeds said threshold value.

13. A method as in claim 12, wherein in step (c) said threshold testing additionally employs a noise threshold value with a positive test result indicative that a derived monopulse signal magnitude exceeds both of said jamming and noise threshold values.

14. A method as in claim 10, wherein in step (d) said monopulse azimuth processing utilizes sum and difference signal relative amplitude and phase.

15. A method as in claim 10, wherein in steps (d) and (e) said target azimuth value is the azimuth of the target relative to antenna boresight at a reference alignment of said antenna.

16. A method as in claim 10, wherein in step (e) said non-monopulse azimuth processing uses the monopulse sum signal amplitude relative to antenna pointing azimuth at signal reception.

17. A method as in claim 10, wherein in step (e) said non-monopulse azimuth processing is beamsplitting type processing based on the average of the antenna pointing azimuth angles at reception of the first reply and last reply from said target during an antenna rotation.

18. A method as in claim 10, wherein in step (e) said non-monopulse azimuth processing is beamsplitting type processing based on the average of the antenna pointing azimuth angles at reception of a reply from said target at the leading edge of antenna beam coverage and at reception of a reply from the target at the trailing edge of antenna beam coverage during an antenna rotation.

19. A method as in claim 10, wherein in step (e) said non-monopulse azimuth processing is center of gravity type processing based on summation of the product of a received signal magnitude times antenna pointing azimuth at signal reception, for each reply from a target during an antenna rotation, divided by the summation of all said signal magnitudes.

20. A method as in claim 10, additionally including the step of:

(f) combining the target azimuth value from the applicable one of steps (d) and (e) with target range data for presentation of target location data.

* * * * *